(12) United States Patent
Chupka et al.

(10) Patent No.: US 8,950,221 B2
(45) Date of Patent: Feb. 10, 2015

(54) MOTOR ASSEMBLY FOR WASHING MACHINE

(75) Inventors: Edward Simeon Chupka, Bardstown, KY (US); Jerrod Aaron Kappler, Louisville, KY (US); Timothy T. Hertrick, Lousiville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/438,479

(22) Filed: Apr. 3, 2012

(65) Prior Publication Data
US 2013/0255330 A1 Oct. 3, 2013

(51) Int. Cl.
*D06F 37/30* (2006.01)

(52) U.S. Cl.
USPC ............... 68/212; 68/12.24; 68/140

(58) Field of Classification Search
USPC ................................. 68/212, 12.24
See application file for complete search history.

(56) References Cited

U.S. PATENT DOCUMENTS

| | | | |
|---|---|---|---|
| 5,150,589 A | 9/1992 | Williams et al. | |
| 6,093,984 A | 7/2000 | Shiga et al. | |
| 6,166,474 A | 12/2000 | Kohara et al. | |
| 7,441,421 B2 | 10/2008 | Kim et al. | |
| 7,518,280 B2 | 4/2009 | Ley et al. | |
| 2006/0096329 A1* | 5/2006 | Kim et al. | 68/3 R |
| 2006/0101864 A1* | 5/2006 | Namkung et al. | 68/3 R |
| 2007/0074542 A1* | 4/2007 | Kim | 68/3 R |
| 2011/0036127 A1 | 2/2011 | Lee | |

* cited by examiner

*Primary Examiner* — Joseph L Perrin
*Assistant Examiner* — Levon J Shahinian
(74) *Attorney, Agent, or Firm* — Dority & Manning, P.A.

(57) ABSTRACT

One exemplary embodiment of the present disclosure is directed to a motor assembly for a washing machine. The motor assembly includes a rotor and a stator. The stator includes an inner diameter and an outer diameter with the inner diameter including an insulator. The insulator defines a fastening opening for joining the stator to the washing machine. The insulator includes a locating pin that is separate and in a different plane from the fastening opening and configured to mate with a bearing retainer in the washing machine.

13 Claims, 5 Drawing Sheets

MOTOR ASSEMBLY FOR WASHING MACHINE

FIELD OF THE INVENTION

The present disclosure relates generally to washing machines, and more particularly to a motor assembly for a washing machine.

BACKGROUND OF THE INVENTION

Conventional washing machines typically include a basket that holds articles such as clothes to be washed, an agitator disposed within the basket which agitates the clothes in the basket, and a motor which drives the agitator and the basket. The motor is typically a permanent magnet synchronous motor, which can reverse its rotation direction to achieve different modes in the wash cycle.

The motor assembly can include a rotor and a stator. The stator must be positioned such that an air gap is present between the rotor and stator. However, it is very important that the air gap between the rotor and stator be minimized to improve the efficiency of the motor. Air gap is a measure of the distance between rotor magnets on the innermost diameter of the rotor and the outermost diameter of poles of the stator. As such, the more accurately that the rotor and stator can be located, the smaller the air gap that will be present. Decreasing the air gap that is present can also allow for the use of less material and weaker magnets in the stator, thus resulting in a lower cost motor.

Thus, a need exists for a motor assembly that allows for a decreased air gap.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a motor assembly for a washing machine. The motor assembly includes a rotor and a stator. The stator includes an inner diameter and an outer diameter with the inner diameter including an insulator. The insulator defines a fastening opening for joining the stator to the washing machine. The insulator includes a locating pin that is separate and in a different plane from the fastening opening and configured to mate with a bearing retainer in the washing machine.

Another exemplary embodiment is directed to a washing machine. The washing machine includes a bearing assembly and a motor assembly. The motor assembly has a rotor, stator, and fastener. The stator includes an inner diameter and an outer diameter. The inner diameter includes an insulator that defines a fastening opening with the fastener positioned therein to join the stator to the washing machine. The insulator includes a locating pin that is separate and in a different plane from the fastening opening and mates with the bearing retainer in the washing machine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
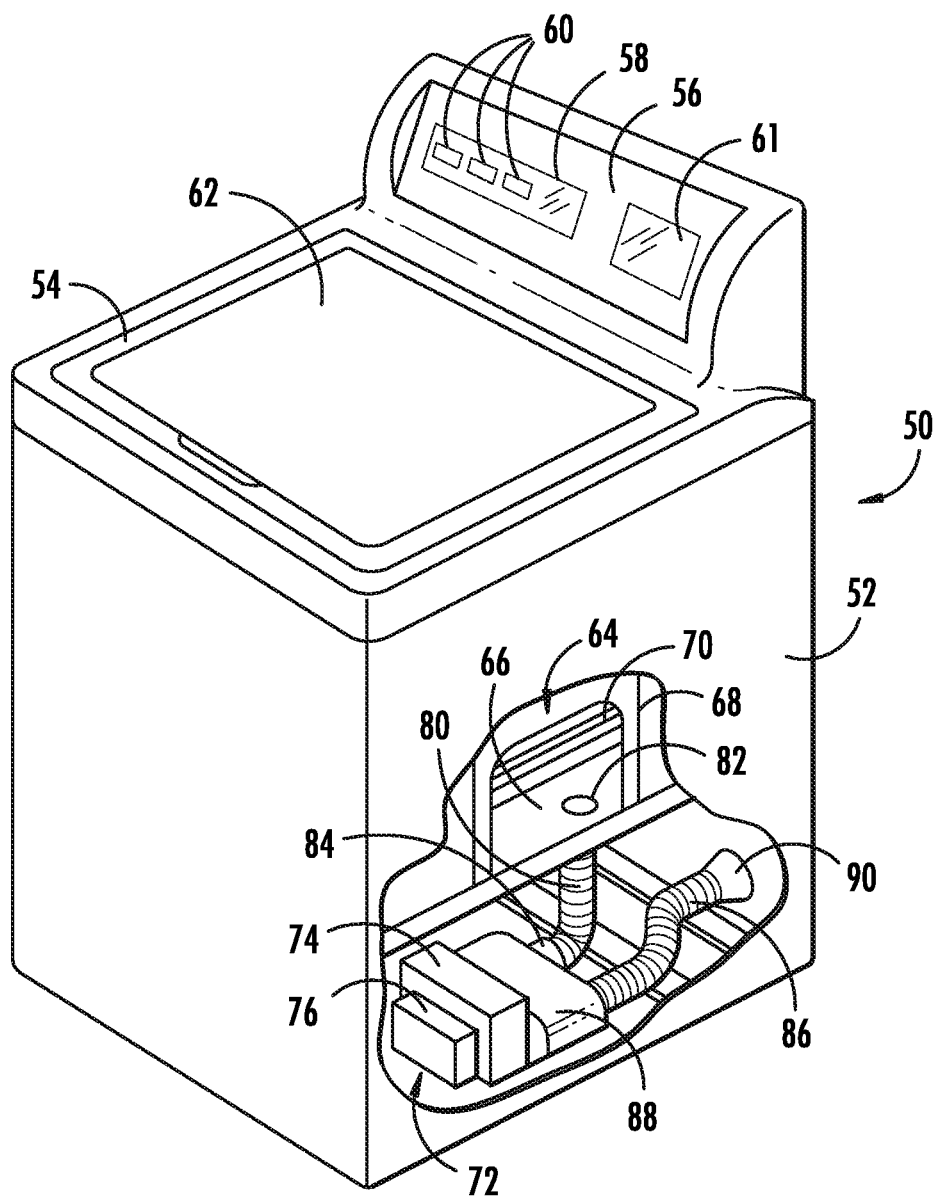
FIG. 1 illustrates a washing machine in accordance with certain exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a motor assembly for a washing machine. The motor assembly includes a rotor and a stator. The stator includes an insulator having a locating pin that provides for efficient placement of the stator and minimization of the air gap between the rotor and stator. In this manner, the efficiency of the motor can be improved. Decreasing the air gap also allows for the use of less material and weaker magnets in the stator, thus resulting in a lower cost motor.

FIG. 1 is a perspective view partially broken away of an exemplary washing machine 50 including a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64.

As illustrated in FIG. 1, washing machine 50 is a vertical axis washing machine. While the present disclosure is discussed with reference to a vertical axis washing machine, those of ordinary skill in the art, using the disclosures provided herein, should understand that the subject matter of the present disclosure is equally applicable to other washing machines, such as horizontal axis washing machines.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

Figure 2:
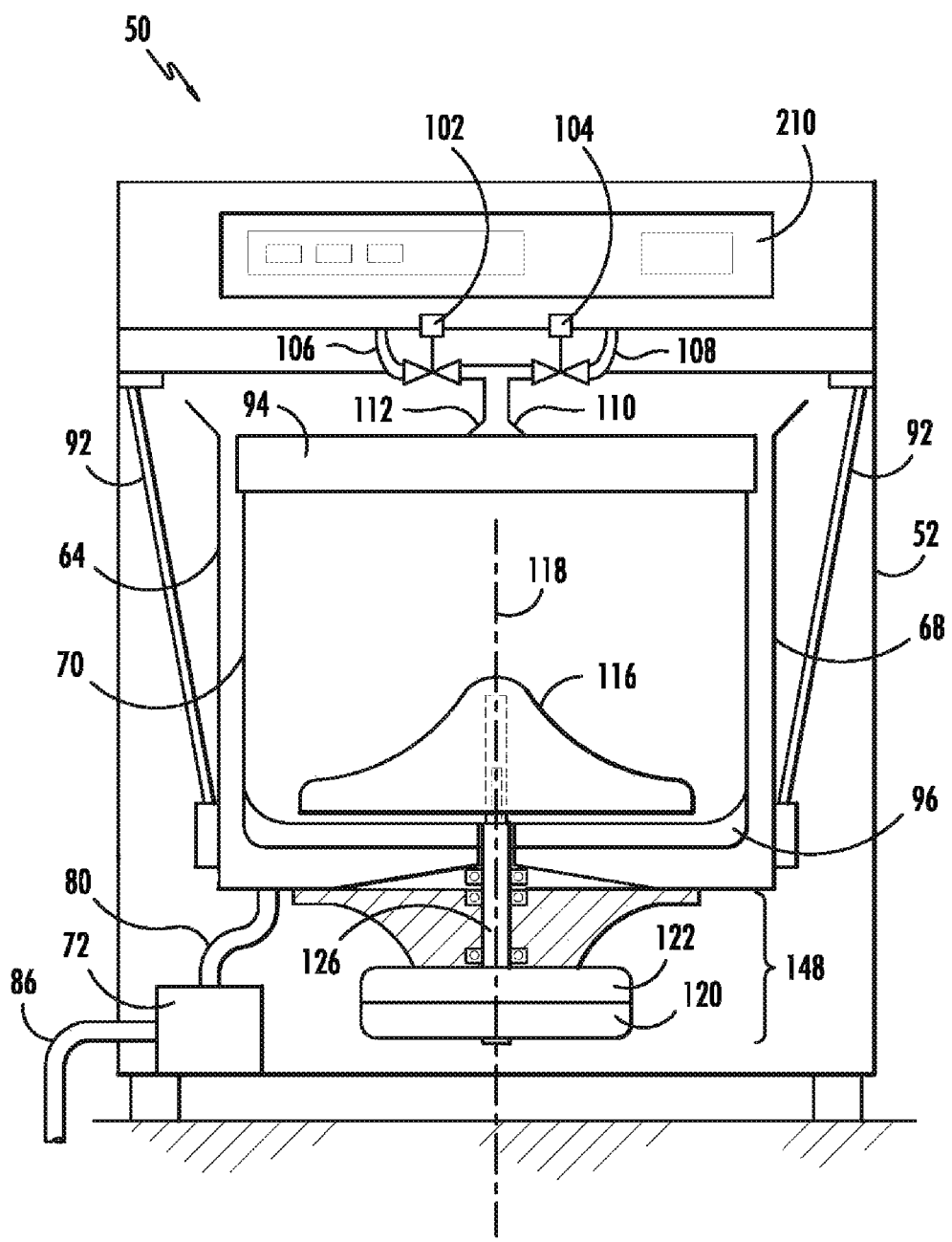
FIG. 2 is a diagram of the electrical system for the washing machine shown in FIG. 1 in accordance with certain exemplary embodiments of the present disclosure.

FIG. 2 is a front elevational schematic view of washing machine 50 including wash basket 70 movably disposed and rotatably mounted in wash tub 64 in a spaced apart relationship from tub side wall 68 and tub bottom 66. Basket 70 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine 50 and, when connected to a building plumbing system (not shown), provide a fresh water supply for use in washing machine 50. Liquid valves 102, 104 and liquid hoses 106, 108 are connected to a basket inlet tube 110, and fluid is dispersed from inlet tube 110 through a known nozzle assembly 112 having a number of openings therein to direct washing liquid into basket 70 at a given trajectory and velocity. A known dispenser (not shown in FIG. 2), may also be provided to produce a wash solution by mixing fresh water with a known detergent or other composition for cleansing of articles in basket 70.

A known agitation element 116, such as a vane agitator, impeller, auger, or oscillatory basket mechanism, or some combination thereof is disposed in basket 70 to impart an oscillatory motion to articles and liquid in basket 70. In different embodiments, agitation element 116 may be a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 116 is oriented to rotate about a vertical axis 118.

Basket 70 and agitator 116 are driven by a motor 120 through a transmission and clutch system 122. In an exemplary embodiment, motor 120 is a three-phase variable speed motor. The motor 120 drives shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a motor assembly 148.

Basket 70, tub 64, and machine drive system 148 are supported by a vibration dampening suspension system 92. The damping system 92 can include a plurality of damping elements, such as piston-cylinder damping elements, coupled to the wash tub 64. The suspension system 92 can include other elements, such as a balance ring 94 disposed around the upper circumferential surface of the wash basket 70. The balance ring 94 can be used to counterbalance any out of balance condition for the wash machine as the basket 70 rotates within the wash tub 64. The wash basket 70 could also include a balance ring 96 located at a lower circumferential surface of the wash basket 70.

Suspension system 92 operates to dampen dynamic forces as the wash basket 70 rotates within the wash basket 64. The suspension system 92 has various natural operating frequencies of the dynamic system. These natural operating frequencies are referred to as the modes of suspension for the washing machine. For instance, the first mode of suspension for the washing machine occurs when the dynamic system including the wash basket 70, tub 64, and suspension system 92 are operating at the first resonant or natural frequency of the dynamic system.

Operation of machine 50 is controlled by a controller 210 which is operatively coupled to the user interface input located on washing machine backsplash 56 (shown in FIG. 1) for user manipulation to select washing machine cycles and features. In response to user manipulation of the user interface input, controller 210 operates the various components of machine 50 to execute selected machine cycles and features.

In an illustrative embodiment, laundry items are loaded into basket 70, and washing operation is initiated through operator manipulation of control input selectors 60 (shown in FIG. 1). Tub 64 is filled with water and mixed with detergent to form a wash fluid, and basket 70 is agitated with agitation element 116 for cleansing of laundry items in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with pump assembly 72. Laundry items are then rinsed and portions of the cycle repeated, including the agitation phase, depending on the particulars of the wash cycle selected by a user.

Figure 3:
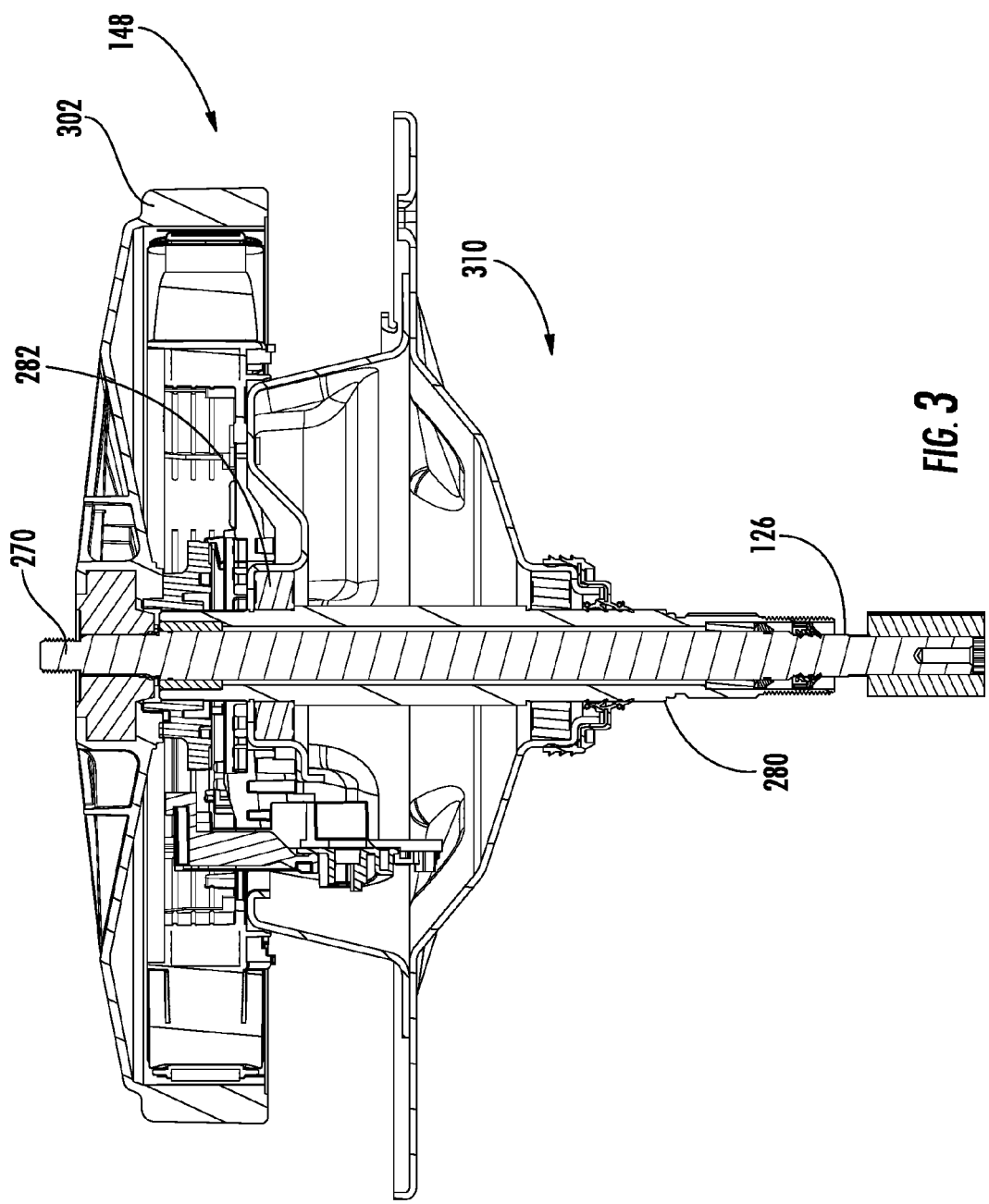
FIG. 3 is a cross-sectional view of a drive in accordance with certain aspects of the present disclosure.
Figure 4A:
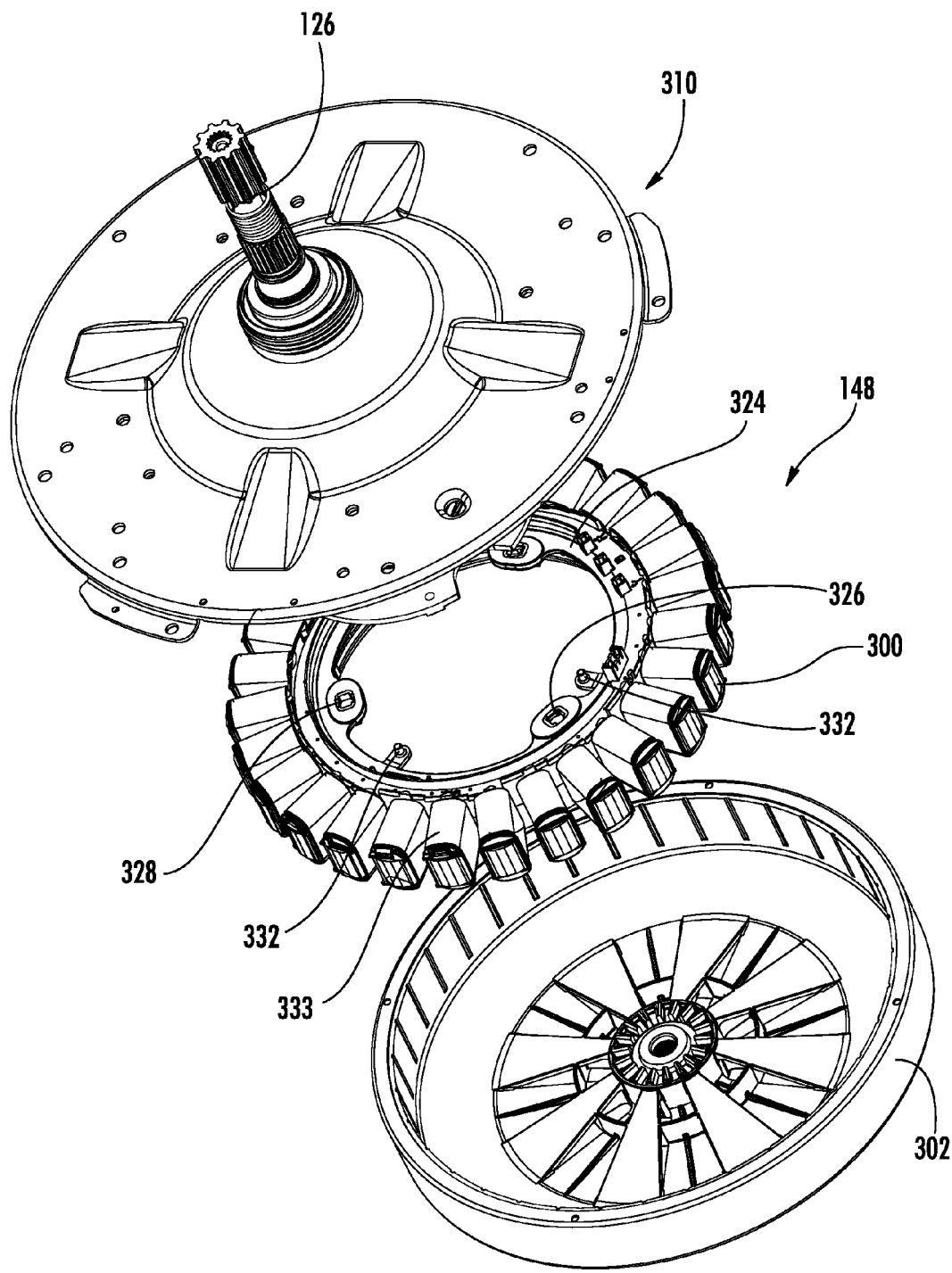
FIGS. 4A and 4B are exploded view of the drive of FIG. 3 in accordance with certain aspects of the present disclosure.
Figure 4B:
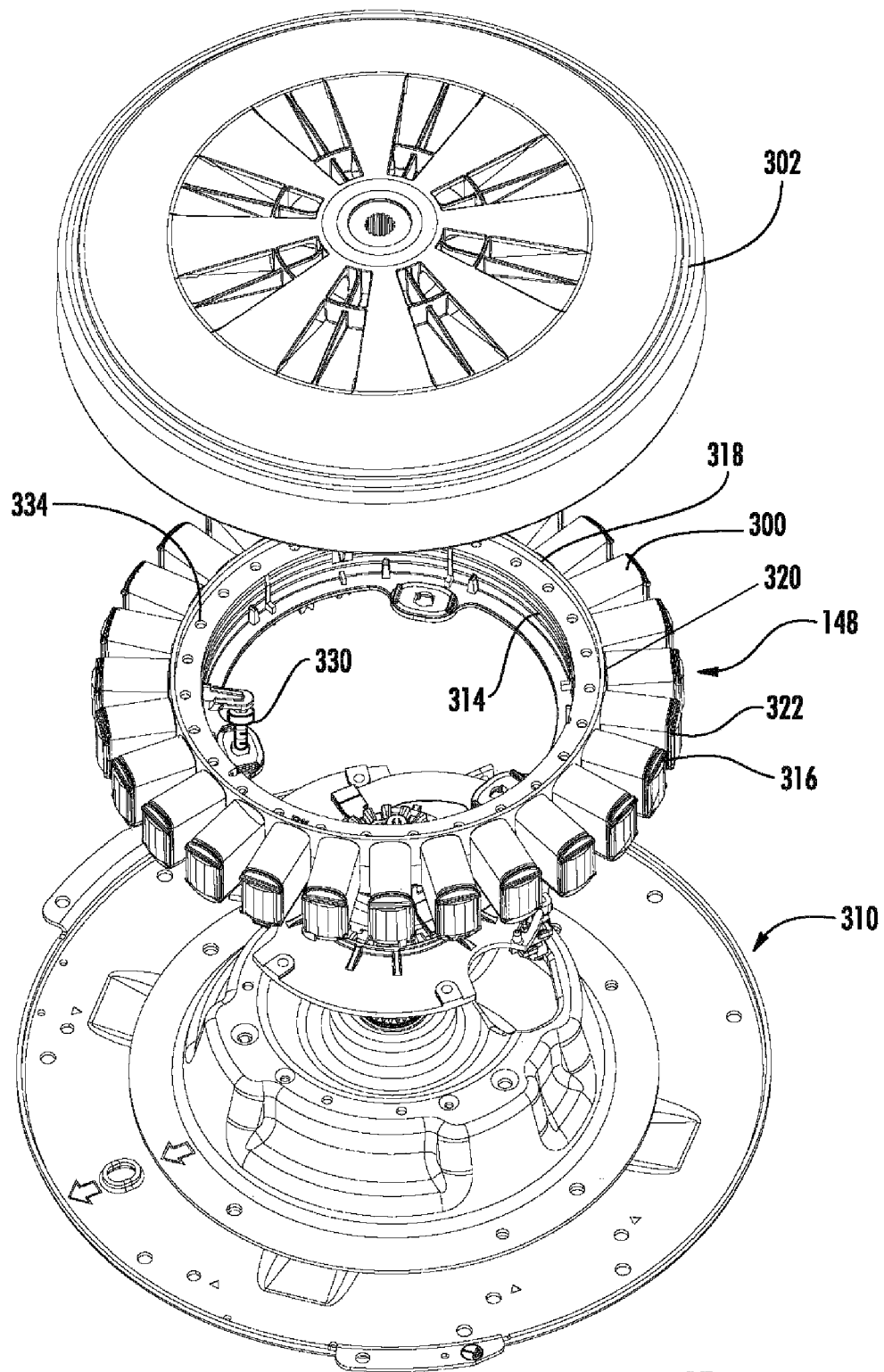

FIG. 3 is a cross-sectional view and FIGS. 4a and 4b are exploded perspective views of motor assembly 148 and bearing assembly 310. Bearing assembly 310 is mounted to a stationary surface of washing machine to rotatably support the drive shaft 126. Drive shaft 126 includes an inner agitator drive shaft 270 and outer basket drive shaft 280. Bearings 282 are interposed between the bearing assembly 310 and drive shaft 126 to assure smooth rotation of drive shaft 126.

Motor assembly 148 includes a stator assembly 300 and a rotor assembly 302. Stator assembly 300 includes steel laminations, insulator wire, and insulator. The insulator separates the magnet wire from the laminations. The insulator includes fastening features on the inner diameter for fastening the stator to the washing machine. Rotor assembly 302 is arranged around stator assembly 300 so as to be rotated via electromagnetic interaction with the stator assembly 300. Stator assembly 300 is generally circular in shape and has an inner diameter 314 and an outer diameter 316.

Stator assembly 300 includes a stator core 318 having teeth 320 arranged around an outer periphery of stator core 318 to protrude outwardly in a radial direction. Stator core 318 and teeth 320 provide support for stator coils 322 formed from insulated conductive wire. Stator assembly 300 includes a first side 333 that is arranged close to bearing assembly 310 when stator assembly is mounted to washing machine. Stator assembly also has a second side 334 that is opposite to first side 333 and is arranged more closely to rotor assembly 302.

Stator assembly 300 also includes insulator assembly 324. Insulator assembly 324 is made of an electrically insulating material and is disposed along inner diameter of stator assembly 300. Insulator assembly 324 includes a first protrusion 326 that defines a fastening opening 328 for joining the stator assembly 300 to the washing machine. In this regard, fastening opening 328 can be threaded to receive a fastener 330, such as a screw. The fastening opening 328 is not necessarily threaded. However, any suitable fastener can be utilized to join stator assembly 300 to the washing machine. In addition, more than one fastening opening 328 and fastener 330 can be present at additional first protrusions 326. Fastening opening(s) 328 can correspond to opening(s) in bearing assembly 310 through which fastener(s) 330 pass through to secure stator assembly 300 to washing machine.

Insulator assembly 324 also includes a locating pin 332 that is separate and in a different plane from the fastening opening 328 and configured to mate with a bearing assembly 310 in the washing machine. In this manner, stator assembly 300 can be accurately positioned to allow for a decreased air gap between stator, item 300 and rotor, item 302.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A motor assembly for a washing machine appliance having a wash tub, the motor assembly comprising:
    a bearing assembly for mounting to a stationary surface of the washing machine appliance;
    a rotor assembly that is rotatable about an axis of rotation;
    a stator assembly positioned at least partially within the rotor assembly, the stator assembly having an inner diameter defining a circumferential direction;
    an insulator assembly disposed along the inner diameter of the stator assembly, the insulator assembly comprising
        a first protrusion extending towards the axis of rotation from the stator assembly along a first plane that is orthogonal to the axis of rotation, the first protrusion defining a fastener opening for joining the insulator assembly to the washing machine appliance;
        a second protrusion extending towards the axis of rotation from the stator assembly along a second plane that is orthogonal to the axis of rotation, the second protrusion separate from the first protrusion and displaced from the first protrusion along the circumferential direction, the second protrusion not defining an additional fastener opening; and
        a locating pin supported upon the second protrusion and extending in a direction towards the bearing assembly parallel to the axis of rotation without intersecting the first plane.

2. The motor assembly of claim 1, wherein the insulator assembly further comprises a plurality of fastener openings for joining the insulator assembly to the washing machine appliance.

3. The motor assembly of claim 1, wherein the insulator assembly further comprises a plurality of first protrusions extending toward the axis of rotation from the stator assembly.

4. The motor assembly of claim 3, wherein each first protrusion defines at least one fastener opening for joining the insulator assembly to the washing machine appliance.

5. The motor assembly of claim 1, wherein the locating pin is received into the bearing assembly.

6. A washing machine appliance, comprising:
    a wash tub;
    a rotatable wash basket received within the wash tub and configured for the receipt of articles for cleaning, the wash basket rotatable about an axis of rotation;
    a bearing assembly for mounting to a stationary surface of the washing machine appliance;
    a rotor assembly that is rotatable about the axis of rotation and is configured for causing the wash basket to rotate about the axis of rotation;
    a stator assembly positioned at least partially within the rotor assembly, the stator assembly having an inner diameter defining a circumferential direction;
    an insulator assembly disposed along the inner diameter of the stator assembly, the insulator assembly comprising
        a first protrusion extending towards the axis of rotation from the stator assembly along a first plane that is orthogonal to the axis of rotation, the first protrusion defining a fastener opening for joining the insulator assembly to the washing machine appliance;
        a second protrusion extending towards the axis of rotation from the stator assembly along a second plane that is orthogonal to the axis of rotation, the second protrusion separate from the first protrusion and displaced from the first protrusion along the circumferential direction, the second protrusion not defining an additional fastener opening; and
        a locating pin supported upon the second protrusion and extending in a direction towards the bearing assembly parallel to the axis of rotation without intersecting the first plane.

7. The washing machine appliance of claim 6, wherein the insulator assembly further comprises a plurality of fastener openings for joining the insulator assembly to the washing machine appliance.

8. The washing machine appliance of claim 6, wherein the insulator assembly further comprises a plurality of first protrusions extending toward the axis of rotation from the stator assembly.

9. The washing machine appliance of claim 8, wherein each first protrusion defines at least one fastener opening for joining the insulator assembly to the washing machine appliance.

10. The washing machine appliance of claim 6, wherein the locating pin is received into the bearing assembly.

11. The washing machine appliance of claim 6, wherein the first plane and second plane are not coplanar.

12. A motor assembly for a washing machine appliance having a wash tub, the motor assembly comprising:
    a bearing assembly for mounting to a stationary surface of the washing machine appliance;
    a rotor assembly that is rotatable about an axis of rotation;
    a stator assembly positioned at least partially within the rotor assembly, the stator assembly having an inner diameter;
    an insulator assembly disposed along the inner diameter of the stator assembly, the insulator assembly comprising
        a first protrusion extending towards the axis of rotation from the stator assembly along a first plane that is orthogonal to the axis of rotation, the first protrusion defining a fastener opening for joining the insulator assembly to the washing machine appliance;
        a second protrusion extending towards the axis of rotation from the stator assembly along a second plane that is orthogonal to the axis of rotation, the second protrusion separate from the first protrusion, the second protrusion not defining an additional fastener opening; and a locating pin supported upon the second protrusion and extending parallel to the axis of rotation without intersecting the first plane.

13. The motor assembly of claim 12, wherein the stator assembly defines a circumferential direction and the second protrusion is displaced from the first protrusion along the circumferential direction.

* * * * *